No. 12,753. REISSUED FEB. 18, 1908.
R. M. CRAIG.
DENTURE.
APPLICATION FILED NOV. 13, 1907.
FIG. I.
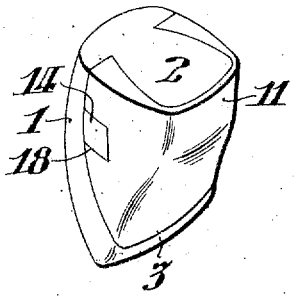
FIG. II.
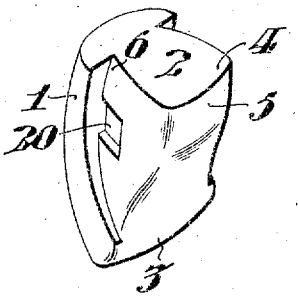
FIG. III.
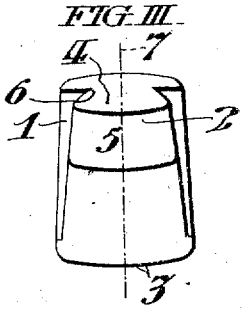
FIG. IV.
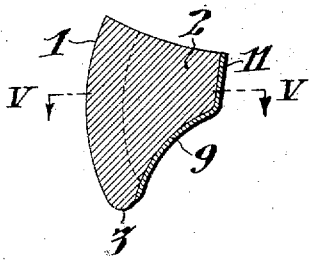
FIG. V.
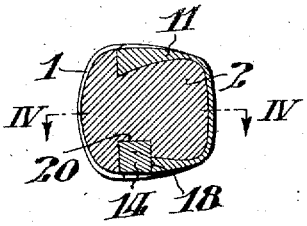
FIG. VI.
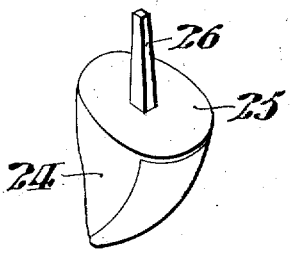
WITNESSES:
Clifton C. Hallowell
Thomas H. Kerr
INVENTOR:
ROBERT M. CRAIG,
by Arthur E. Paige
Atty.

UNITED STATES PATENT OFFICE.

ROBERT MEADE CRAIG, OF DENNISON, OHIO.

DENTURE.

No. 12,753. Specification of Reissued Letters Patent. Reissued Feb. 18, 1908.

Original No. 830,887, dated September 11, 1906. Serial No. 296,499. Application for reissue filed November 13, 1907. Serial No. 402,048.

*To all whom it may concern:*

Be it known that I, ROBERT MEADE CRAIG, of Dennison, in the county of Tuscarawas, in the State of Ohio, have invented a certain new and useful Improvement in Dentures, whereof the following is a specification, reference being had to the accompanying drawings.

My improvement relates to a porcelain tooth facing fitted in a backing of other material, which may be utilized in a plate, bridge, or other type of denture.

It is an object of my invention to so construct and arrange the facing and backing that they may be quickly and conveniently fitted together, and the porcelain may be readily removed without removing the entire denture.

An adjunctive feature of my invention is the provision of a locking device connecting the facing and backing and normally preventing the separation of the same.

The denture hereinafter described comprises a porcelain body forming a facing shaped like a natural tooth, and a posterior dovetail portion fitting a correspondingly shaped recess in the backing. The side faces of said dovetail converge both from the occlusal end of the denture toward its gingival end, and from the lingual toward the labial side thereof, said converging side faces being symmetrically disposed with respect to a plane which is vertical, and central with respect to said porcelain body. Moreover, said dovetail is preferably curved on all sides in conformity with the natural curvature of the tooth for which the denture is substituted, so as to afford the maximum strength within the limits defined by the natural tooth contour.

My invention comprises the various novel features of construction and arrangement hereinafter more definitely specified.

In the drawings: Figure I, is a perspective view of a denture representing an incisor tooth. Fig. II, is a perspective view of the porcelain body of the denture shown in Fig. I. Fig. III, is a rear elevation of said porcelain body shown in Fig. II. Fig. IV, is a central vertical sectional view of said denture. Fig. V, is a horizontal sectional view of said denture. Fig. VI, is a perspective view of a denture similar to that shown in Fig. I, but provided with a post.

In said figures; the porcelain body comprises the anterior portion 1, and the posterior portion 2, in unitary relation. Said anterior portion forms a facing which may be of any shape or size to represent a natural tooth, and said posterior portion forms a dovetail, whereby said body is supported in and engaged by the backing 3, which may form part of a plate, bridge or other denture. At best shown in Fig. III, said dovetail 2, is wedge shaped in two directions at right angles to each other, its side faces converging both from its occlusal or incisal end 3, to its gingival end 4, and from its lingual side 5, toward its labial or buccal side 6, where it merges into the anterior portion 1; said converging surface being symmetrically disposed with respect to the central vertical plane indicated by the line 7, in Fig. III. Said posterior dovetail portion 2, is also converged and concavely curved longitudinally in its lingual face, from its gingival end toward its incisal end as best shown at 9, in Fig. IV. Said posterior portion 2, of said porcelain body being converged in three directions, as above described, is fitted in a correspondingly shaped recess in the metallic backing 11, the exterior contour of which resembles that of the tooth imitated by the anterior portion 1, of said porcelain body, and the arrangement is such that the strains to which the denture is normally subjected, viz: pressure in a direction from its incisal or occlusal end toward its gingival end, and transversely from its lingual to its labial side merely serve to more firmly seat the porcelain in its backing. However, the porcelain may be readily removed from its backing without disturbing the permanent position of the latter in bridge work, for instance, by sliding the porcelain out from the backing in a direction coincident with the curvature 9, of the lingual face of the denture, shown in Fig. IV.

Although, as above described, the porcelain is normally retained in its backing by means of its posterior wedge shaped portion, it may be locked in the backing by means of the key 14, which extends through the opening 18, in the backing 11, as shown in Fig. I, and is engaged in the recess 20, in said porcelain body.

The form of my invention shown in Figs. I to V, inclusive, is adapted for inclusion in plate or bridge work, and consequently does not comprise any individual cap plate at its gingival end. However, I show in Fig.

III, a crown which is adapted to be attached singly to a root, its backing 24, being provided with a cap plate 25, and post 26, at its gingival end. Although I have shown a denture representing an incisal tooth, it is to be understood that my invention may be embodied in a denture of any other shape or size, representing a natural tooth. Therefore, it is to be understood that I do not desire to limit myself to the precise details of construction and arrangement above described, as various modifications may be made therein without departing from the essential features of my invention, as defined in the appended claims.

I claim:—

1. In a denture, a porcelain having its body portion dovetail in cross-section, being widest at the rear, forming thereby shoulders and side faces, a backing also interiorly dovetail in cross-section, which backing fits close to the said side faces and against said shoulders, and a locking device for the backing.

2. In a denture, a porcelain provided with a posterior portion dovetail in cross-section, the anterior portion of said porcelain extending beyond the side faces of the posterior portion of the porcelain, one of said side faces having a recess therein, and a backing dovetail in cross-section, which backing conforms strictly to the contour of the posterior portion of the porcelain and adheres closely thereto, the side members of the said backing engaging with the shoulders formed by the extension of the anterior portion of the porcelain beyond the sides of its posterior portion, one of the side members of the backing having an opening therein adapted to register with the recess in the porcelain, and a key passed through said opening into said recess.

3. In a denture, the combination with a recessed backing; of a porcelain body having a wedge shaped portion removably engaging said backing, of greatest cross-sectional area at its gingival end, but having its widest portion at its occlusal end.

4. In a denture, the combination with a recessed backing; of a porcelain body having a wedge shaped portion removably engaging said backing and converging both from its occlusal end toward its gingival end and from its lingual side toward its labial side.

In testimony whereof, I have hereunto signed my name at Dennison, Ohio, this 29th day of October, 1907.

ROBERT MEADE CRAIG.

Witnesses:
B. BALDWIN,
JULIA ORR.